May 25, 1926.

W. G. DOUD

CHILD'S VEHICLE

Filed Sept. 29, 1925

1,585,832

Inventor
Willis G. Doud
By Lyon & Lyon
Attorney

Patented May 25, 1926.

1,585,832

UNITED STATES PATENT OFFICE.

WILLIS G. DOUD, OF LOS ANGELES, CALIFORNIA.

CHILD'S VEHICLE.

Application filed September 29, 1925. Serial No. 59,312.

This invention relates to children's vehicles of the type driven by movement of the legs of the occupant of the vehicle.

An important object of the invention is to provide a vehicle of this character that can be easily driven at a comparatively high rate of speed by relatively slow movement of the operator's legs.

The invention is illustrated as embodied in a front wheel drive vehicle but the appended claims are not limited to such drive.

Other objects and advantages will appear hereinafter.

The accompanying drawings illustrate the invention:

Figure 1:
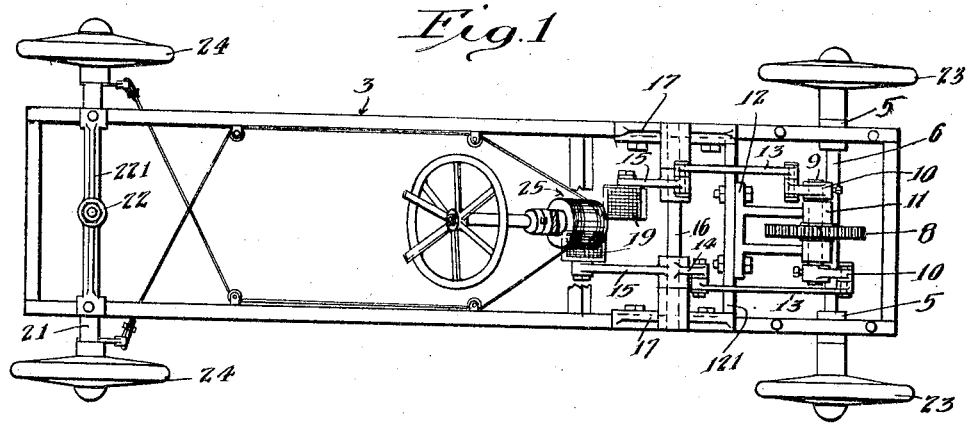
Fig. 1 is a plan view of a child's vehicle embodying the invention.
Figure 2:
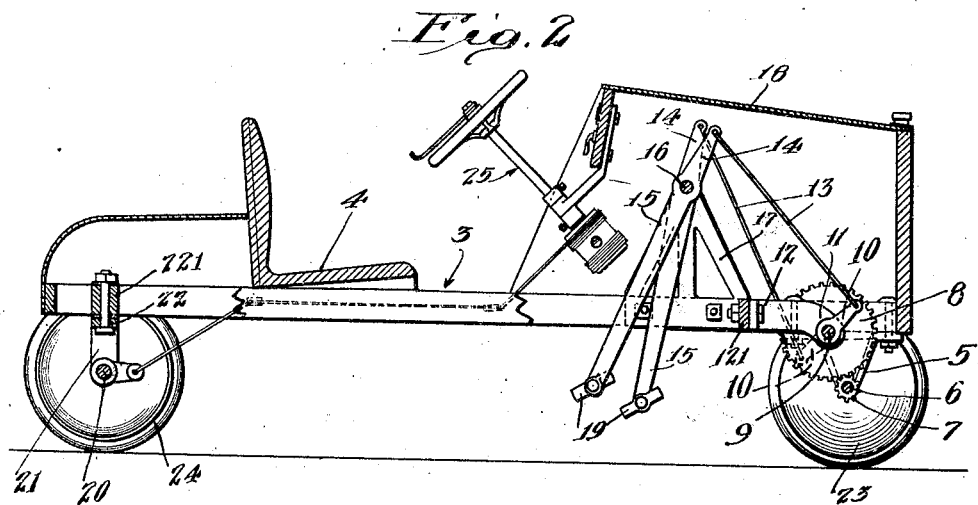
Fig. 2 is a front elevation of Fig. 1, partly in longitudinal mid-section.

There is provided a suitable frame 3 which, in this instance, is substantially rectangular and on the frame is mounted a seat 4. At the front end of the frame 3 are downwardly extending brackets 5 in which is journaled a front axle 6 driven by a spur pinion 7 in mesh with a spur gear 8. The gear 8 is mounted on a shaft 9 which is turned by a pair of oppositely disposed arms 10. The shaft 9 is journaled in bearings 11 formed in a bracket 12 that is bolted or otherwise secured to a cross-member 121 bolted to the frame 3. Pivotally connected with each of the arms 10 is a connecting rod 13, and each connecting rod in turn is pivotally connected to the shorter arm 14 of a lever, of which the longer arm is indicated at 15. The rods 13 extend aslant between the levers and the arms 10.

The levers 14, 15 are fulcrumed intermediate of their ends on a horizontal pivot 16 which is supported in the upper ends of standards 17 integral with the cross member 121 and projecting above the level of the frame 3. The shorter arms 14 are above the fulcrum and the longer arms 15 are below said fulcrum and project below the level of the frame. The rods 13, levers 14, 15 and standard 17 are positioned beneath a hood 18 which is mounted in any suitable manner upon the front portion of the frame 3. The lower ends of the lever arms 15 project below the level of the frame 3 and are provided with suitable pedals 19 for engagement by the feet of the operator.

The rear axle is indicated at 20 and is dirigibly connected with the frame, the axle extending through the end portions of and supporting a bracket 21 which is pivoted at 22 to a cross member 221 of the frame. The axle 6 is provided with wheels 23 and the axle 20 is provided with wheels 24.

Suitable steering mechanism 25 is indicated for turning the bracket 21 about its pivot 22 to effect steering of the vehicle. This type of steering mechanism is well understood in this art, and, therefore, need not be illustrated and described in detail herein.

It is to be particularly noted that, though a front wheel drive is illustrated, the same drive could be used as a rear wheel drive by simply making the connecting rods 13 of the requisite greater length.

To propel the vehicle, the operator, placing his feet upon the pedals 19, will alternately push forward on said pedals so as to drive the connecting rods 13, thus rotating the arms 10, gears 7, 8, axle 6 and wheels 23.

It is to be noted that, by the construction above described, the leverage is relatively great and, at the same time, the arrangement is such that the driving gear is hidden by the hood 18.

Though the invention is termed a child's vehicle, it is to be understood that it may also be used by invalid or crippled adults or others.

I claim:—

1. A child's vehicle comprising a frame, axles supporting the frame, wheels supporting the axles, a spur pinion on one of the axles, a shaft rotatably connected with the frame, a pair of oppositely disposed arms on the shaft, a gear on the shaft in mesh with the pinion, standards connected with the frame, levers fulcrumed on the upper ends of the standards with their lower ends projecting below the level of the frame, rods connecting the upper ends of the levers to the arms, and pedals on the lower ends of the levers.

2. A child's vehicle comprising a frame, axles supporting the frame, wheels supporting the axles, a shaft rotatably connected with the frame, a pair of oppositely disposed arms on the shaft, a toothed driving member on the shaft, a toothed driven member operable by the first toothed member, standards connected with the frame, levers fulcrumed on the upper ends of the standards with their lower ends projecting below the level of the frame, rods connecting the levers to the arms, and pedals connected with the lower ends of the levers.

3. A child's vehicle comprising a frame, axles supporting the frame, wheels supporting the axles, standards connected with the frame, levers fulcrumed intermediate of their ends on the upper ends of the standards, the levers having shorter arms above the fulcrum and longer arms below the fulcrum and projecting below the level of the frame, rods connected with the shorter arms of the levers, and gearing operably connected with the rods and with one of the axles.

4. A child's vehicle comprising a frame, axles supporting the frame, wheels supporting the axles, standards connected with the frame, levers fulcrumed intermediate of their ends on the upper ends of the standards, the levers having shorter arms above the fulcrum and longer arms below the fulcrum, a shaft rotatably connected with the frame, arms on the shaft, rods extending aslant between the shorter arms of the levers and the last mentioned arms and pivoted thereto, a gear on the shaft, and a pinion on one of the axles in mesh with the gear.

5. A child's vehicle comprising a frame, axles supporting the frame, wheels supporting the axles, a spur pinion on one of the axles, a shaft rotatably connected with the frame, a pair of oppositely disposed arms on the shaft, a gear on the shaft in mesh with the pinion, standards connected with the frame, levers fulcrumed on the upper ends of the standards with their lower ends projecting below the level of the frame, rods connecting the levers to the arms, and pedals on the lower ends of the levers.

Signed at Los Angeles, Calif., this 21st day of September, 1925.

WILLIS G. DOUD.